US008910579B2

(12) United States Patent
Schneider

(10) Patent No.: US 8,910,579 B2
(45) Date of Patent: Dec. 16, 2014

(54) RAIL VEHICLE WITH LATERALLY SOFT CONNECTION OF THE WAGON BODY TO THE RUNNING GEAR

(75) Inventor: Richard Schneider, Löhningen (CH)

(73) Assignee: Bombardier Transportation GmbH, Berlin (DE)

( * ) Notice: Subject to any disclaimer, the term of this patent is extended or adjusted under 35 U.S.C. 154(b) by 115 days.

(21) Appl. No.: 13/395,949

(22) PCT Filed: Sep. 14, 2010

(86) PCT No.: PCT/EP2010/063483
§ 371 (c)(1),
(2), (4) Date: May 29, 2012

(87) PCT Pub. No.: WO2011/032945
PCT Pub. Date: Mar. 24, 2011

(65) Prior Publication Data
US 2012/0227617 A1     Sep. 13, 2012

(30) Foreign Application Priority Data
Sep. 15, 2009   (DE) .......................... 10 2009 041 109

(51) Int. Cl.
*B61F 5/22*   (2006.01)
*B61F 5/24*   (2006.01)
*B60G 99/00*  (2010.01)

(52) U.S. Cl.
CPC ...... *B60G 99/002* (2013.01); *B60G 2800/0124* (2013.01); *B60G 2300/102* (2013.01); *B60G 2300/10* (2013.01); *B60G 2800/9124* (2013.01); *B60G 2204/16* (2013.01); *B60G 2200/34* (2013.01); *B60G 2204/41* (2013.01); *B60G 2204/122* (2013.01); *B61F 5/22* (2013.01); *B61F 5/24* (2013.01)
USPC ...................................... 105/199.2

(58) Field of Classification Search
CPC ........................................ B61F 5/24
USPC ...................................... 105/199.2
See application file for complete search history.

(56) References Cited

U.S. PATENT DOCUMENTS 3,628,465 A   12/1971 Dobson et al.
5,222,440 A   6/1993  Schneider
(Continued)

FOREIGN PATENT DOCUMENTS

DE   2001282        7/1970
DE   4122741 A1     1/1993
(Continued)

*Primary Examiner* — Zachary Kuhfuss
(74) *Attorney, Agent, or Firm* — The Webb Law Firm

(57) ABSTRACT

Disclosed is a vehicle, in particular rail vehicle, with a wagon body and an running gear on which the wagon body is supported, wherein the wagon body and the running gear define a vehicle longitudinal direction, a vehicle transverse direction and a vehicle height direction. A tilting mechanism is arranged between the wagon body and the running gear, which is designed to impose, during a transverse displacement in the vehicle transverse direction, upon the wagon body a rolling motion about a rolling axis parallel to the vehicle longitudinal direction. The tilting mechanism comprises a transverse decoupling device, which is designed to reduce the stiffness of the tilting mechanism against a pure transverse displacement of the wagon body with respect to the running gear. The invention furthermore relates to a corresponding tilting mechanism.

13 Claims, 3 Drawing Sheets

(56) References Cited

U.S. PATENT DOCUMENTS

| | | | |
|---|---|---|---|
| 5,351,624 A | 10/1994 | Ahlborn et al. | |
| 2002/0035947 A1 | 3/2002 | Sebata et al. | |
| 2006/0117986 A1* | 6/2006 | Schneider et al. | 105/199.2 |
| 2007/0137515 A1* | 6/2007 | Schneider et al. | 105/182.1 |
| 2012/0118194 A1 | 5/2012 | Schneider et al. | |
| 2012/0137926 A1* | 6/2012 | Schneider | 105/413 |
| 2013/0018535 A1* | 1/2013 | Schneider et al. | 701/19 |
| 2013/0032054 A1* | 2/2013 | Schneider et al. | 105/199.1 |

FOREIGN PATENT DOCUMENTS

| | | |
|---|---|---|
| DE | 4311521 C1 | 4/1994 |
| DE | 4410970 C1 | 7/1995 |
| DE | 19500212 A1 | 8/1996 |
| DE | 19532832 C1 | 12/1996 |
| EP | 1190925 A1 | 3/2002 |
| FR | 2232478 A1 | 3/1975 |
| JP | 781559 A | 3/1995 |
| JP | 10230847 A | 9/1998 |
| JP | 10287241 A | 10/1998 |
| JP | 2002104183 A | 4/2002 |
| JP | 2002234437 A | 8/2002 |
| JP | 2005289170 A | 10/2005 |
| WO | 9003906 A1 | 4/1990 |
| WO | 2010112306 A1 | 10/2010 |

* cited by examiner

RAIL VEHICLE WITH LATERALLY SOFT CONNECTION OF THE WAGON BODY TO THE RUNNING GEAR

BACKGROUND OF THE INVENTION

1. Field of the Invention

The present invention relates to a vehicle, in particular a rail vehicle, with a wagon body and a running gear, on which the wagon body is supported, wherein the wagon body and the running gear define a vehicle longitudinal direction, a vehicle transverse direction and a vehicle height direction. A tilting mechanism is arranged between the wagon body and the running gear, which is designed to impose upon the wagon body, during a transverse displacement in the vehicle transverse direction, a rolling motion about a rolling axis parallel to the vehicle longitudinal direction.

2. Description of Related Art

In rail vehicles—but also in other vehicles—, as a rule, the wagon body is spring mounted with respect to the wheel units (for example individual wheels, pairs of wheels or sets of wheels) via one or a plurality of spring stages. Many problems of a travel dynamics nature arise, not least due to the increasingly stringent requirements regarding the safety of the vehicles, passenger comfort, as well as the transport capacity and the service life of the vehicles.

The centrifugal acceleration occurring when negotiating a curve and acting transverse to the travel movement and, therefore, transverse to the vehicle longitudinal axis, due to the comparatively elevatedly located center of gravity of the wagon body, leads to a tendency of the wagon body to incline curve-outwardly relative to the wheel units, and thus to execute a rolling motion about a rolling axis parallel to the vehicle longitudinal axis.

Above specific threshold values, such rolling motions are, on the one hand, detrimental to travelling comfort. On the other hand, they are associated with the danger of failing to comply with the permissible load gauge profile, and also, as regards the tilting stability and thus also the derailment safety, the danger of unallowable unilateral wheel unloadings. In order to prevent this, roll stabilisers as well as active or passive tilting systems are commonly used in modern rail vehicles, which counteract excessive rolling and tilting motions and also adjust the rolling and tilting angles, respectively, and the rolling axis of the vehicle to a value that is adapted to the respective travel state and optimized as far as possible. Such an approach is known for example from EP 1 190 925 A1 (the entire disclosure of which is incorporated herein by reference).

The aforementioned roll stabilisers are known in various hydraulically or purely mechanically acting embodiments. Often, a torsion shaft running transverse to the vehicle longitudinal direction is used. Levers, which are installed in a rotationally rigid manner and extend in the vehicle longitudinal direction, are mounted on this torsion shaft on both sides of the vehicle longitudinal axis. These levers are in turn connected to connecting rods, which are arranged kinematically parallel to the spring devices of the vehicle. When the spring devices of the vehicle are compressed the levers mounted on the torsion shaft are displaced in a rotational movement via the connecting rods that are joined to them.

In the rail vehicle known from EP 1 190 925 A1, the upper ends of the two connecting rods of the roll stabiliser are displaced (in a plane running perpendicular to the vehicle longitudinal axis) towards the center of the vehicle. In this way, the wagon body during a deflection in the vehicle transverse direction (caused for example by the centrifugal acceleration when negotiating a curve) is guided in such a way that a curve-outward rolling motion of the wagon body is counteracted and an curve-inwardly directed rolling motion is imposed upon the wagon body.

This oppositely directed curve-inward rolling motion serves inter alia to increase the so-called tilting comfort for the passengers of the vehicle. A high tilting comfort is normally understood in this connection to mean that the passengers, when negotiating a curve, experience as small a transverse acceleration as possible in the transverse direction of their reference system, which, as a rule, is defined by the fixtures of the wagon body (floor, walls, seats, etc.). Due to the curve-inward tilting of the wagon body resulting from the rolling motion the passengers experience (depending on the degree of tilting) at least a part of the transverse acceleration actually acting in the fixed terrestrial reference system, simply as an increased acceleration in the direction of the vehicle floor, which, as a rule, is felt to be less annoying and unpleasant, respectively.

The maximum permissible values for the transverse acceleration acting in the reference system of the passengers (and the setpoint values for the tilting angle of the wagon body ultimately resulting therefrom) are, as a rule, predetermined by the operators of a rail vehicle. National as well as international standards (such as for example EN 12299) also provide reference points for this purpose.

In this connection, in the vehicle known from EP 1 190 925 A1 it is possible to implement a purely passive system, in which the components of the spring arrangement and of the roll stabilisers are matched to one another so that the desired tilting of the wagon body is achieved solely by the transverse acceleration acting when negotiating a curve.

For such a passive solution, on the one hand, the rolling axis and the instantaneous center of rotation of the rolling motion must lie comparatively high above the center of gravity of the wagon body. On the other hand, the spring arrangement must be designed to be comparatively soft in the transverse direction, in order to achieve the desired deflections with the acting centrifugal force alone. Such a laterally soft spring arrangement also has a positive effect on the so-called vibration comfort in the transverse direction, since impacts in the transverse direction can be absorbed and damped by the soft spring arrangement.

These passive solutions, however, have the disadvantage that, due to the laterally soft spring arrangement and the elevatedly located instantaneous center of rotation, comparatively large transverse deflections in the transverse direction occur not just in normal operation but also in unplanned situations (for example an unforeseen stop of the vehicle in a track curve with a large track superelevation), as a result of which either the typically pre-set load gauge profile is infringed or (in order to prevent this) only comparatively narrow wagon bodies with a reduced transport capacity can be implemented.

The problem of the large deflections in order to achieve a specific rolling angle can of course be reduced by displacing the position of the rolling axis and the instantaneous center of rotation in the direction of the wheel support plane, so that the instantaneous center of rotation is displaced to be relatively close to the center of gravity (to a distance of about 0.3 to 1 m). However, herewith, only significantly smaller rolling angles can be achieved passively. Accordingly, the system therefore additionally stiffens in the transverse direction (since, in the roll stabiliser system, as a rule, all bearings are designed to be very stiff anyway), so that compromises have to be made not only in terms of tilting comfort but also in vibration comfort.

In addition, the kinematics produce a coupling of the two running gears of a wagon body in such a way that, in rotation movements of the wagon body with respect to the running gear (i.e. a yaw motion about a yaw axis parallel to the vehicle height direction), the vehicle is subjected to vehicle twisting possibly leading to wheel unloadings and adversely affecting derailment safety. With double-deck vehicles the instantaneous center of rotation can in addition lie very close to the upper deck of the railcar, which has a significant deleterious effect on comfort in the upper deck.

The rolling motion adapted to the curvature of the track curve actually negotiated and the actual travel speed (and therefore also the actual resultant transverse acceleration) can in the case of the vehicle known from EP 1 190 925 A1 also be actively influenced and adjusted, respectively, by an actuator provided between the wagon body and the running gear frame. In this case, a setpoint value for the rolling angle of the wagon body is determined from the actual track curvature and the actual travel speed, which is then used to adjust the rolling angle via the actuator.

This variant, of course, opens up the possibility of implementing laterally stiffer systems with smaller transverse deflections. It has the disadvantage, however, that the vibration comfort suffers owing to the transverse stiffness introduced by the actuator, so that, for example, transverse impacts on the running gear (for example when travelling over switches or defective parts in the rail) are transmitted in a less damped manner to the wagon body.

In order to compensate at least the disadvantages as regards the vibration comfort by a laterally stiff spring arrangement, it is proposed in WO 90/03906 A1 for a passive system, to incorporate a laterally soft additional spring stage kinematically in series with the tilting and rolling compensation device. This solution has the disadvantage, however, that it increases the necessary installation space due to the additional components. In addition, in this case too, there are again the problems mentioned above as regards the large transverse deflections and the reduced transport capacity.

Accordingly, it is the object of the present invention to provide an actuator and a vehicle, respectively, of the type mentioned initially, which does not have the aforementioned disadvantages, or at least on a reduced extent, and, in particular, provides a high degree of comfort for passengers in a simple and reliable manner with a compact, space-saving design.

SUMMARY OF THE INVENTION

The present invention is based on the technical teaching that a high degree of comfort for passengers is possible in a simple and reliable manner with a compact, space-saving design, if a transverse decoupling device is integrated in the tilting mechanism, which is accompanied by a reduction in the transverse stiffness of the tilting mechanism (hence reduces the resistance of the tilting mechanism to a pure deflection of the wagon body in the vehicle transverse direction). It has been found that, with a suitable design of the components of the tilting mechanism or its mounting to the components immediately adjacent on the running gear side (i.e. for example a running gear frame) or to the components immediately adjacent on the wagon body side (hence, for example, the wagon body or—if present—a wagon body traverse connected to the wagon body), a very compact arrangement can be achieved that requires no significant additional structural space compared to the known designs without such a transverse decoupling.

Due to this additional transverse elasticity of the tilting mechanism, in particular, the vibration comfort is improved. Furthermore, rotation deflection of the wagon body with respect to the running gear can be absorbed in the transverse decoupling device without producing additional twisting. In addition, the comfort and vibration behaviour in the upper part of vehicles can also be better regulated with active systems. This is advantageous, in particular, in double-deck carriages.

According to a first aspect, the present invention therefore relates to a vehicle, in particular a rail vehicle, with a wagon body and an running gear on which the wagon body is supported, wherein the wagon body and the running gear define a vehicle longitudinal direction, a vehicle transverse direction and a vehicle height direction. A tilting mechanism is arranged between the wagon body and the running gear, which is designed to impose, during a transverse displacement in the vehicle transverse direction, upon the wagon body a rolling motion about a rolling axis parallel to the vehicle longitudinal direction. The tilting mechanism comprises a transverse decoupling device, the transverse decoupling device being designed to reduce the stiffness of the tilting mechanism against a pure transverse displacement of the wagon body with respect to the running gear.

The reduction of the transverse stiffness of the tilting mechanism achieved by the transverse decoupling device can, in principle, be chosen to be arbitrarily large in order to achieve the desired gain in comfort. In principle, the necessary reduction of the transverse stiffness is governed by the increased comfort to be achieved as well as the transverse stiffness of the system without the transverse decoupling device. Preferably, the transverse decoupling device, in the vehicle transverse direction, introduces into the tilting mechanism a transverse displaceability of the wagon body with respect to the running gear, wherein the tilting mechanism with uninhibited transverse displaceability of the transverse decoupling device in the vehicle transverse direction has a first transverse stiffness, and the tilting mechanism with inhibited transverse displaceability of the transverse decoupling device in the vehicle transverse direction has a second transverse stiffness. Here, the first transverse stiffness is at most 95% of the second transverse stiffness. Preferably, the first transverse stiffness is 85% of the second transverse stiffness, more preferably at most 60% of the second transverse stiffness. Preferably, the first transverse stiffness is still significantly less than these values. In advantageous variants of the invention, the first transverse stiffness is at most 20% of the second transverse stiffness. In this way, particularly favourable properties can be achieved as regards the vibration comfort.

In further preferred variants of the invention with particularly favourable properties as regards the vibration comfort, the transverse decoupling device, in the vehicle transverse direction, has a transverse stiffness of at most up to 20 kN/mm. Preferably, the transverse stiffness is at most up to 10 kN/mm, and more preferably at most up to 2 kN/mm.

The transverse decoupling device can, in principle, be integrated into the tilting mechanism in any convenient suitable manner and at any convenient suitable location. Preferably, the transverse decoupling device has at least one transverse decoupling unit, which is arranged in the region of the connection of the tilting mechanism to the running gear. Herewith, particularly compact designs may be realized. The transverse decoupling unit can, for example, be integrated in a particularly space-saving manner directly in the bearing (designed, as a rule, as a swivel bearing) of the tilting mechanism on the running gear.

In addition or as an alternative, the transverse decoupling device can be arranged in the area of the connection of the tilting mechanism to the wagon body. At this location as well, particularly compact designs may be achieved, which (if at all) did not noticeably increase the construction space requirements with respect to conventional vehicles. The transverse decoupling, for example, may be integrated in a particularly space-saving manner directly in the bearing (designed, as a rule, as a swivel bearing) of the tilting mechanism on the wagon body or—if present—on a wagon body traverse connected to the wagon body.

In further design variants that can be realised particularly simply and at least almost without any additional need for construction space, the transverse decoupling unit is additionally or alternatively arranged between two components of the tilting mechanism. For example, one or a plurality of the components of the tilting mechanism (for example the swivel lever of a rolling support mounted on the torsion shaft) can be designed to be correspondingly laterally elastic, in order to effect the transverse decoupling.

The transverse decoupling device can, in principle, be designed in an arbitrary suitable manner, in order to incorporate the desired additional transverse elasticity into the tilting mechanism. Preferably, the transverse decoupling device comprises at least one transverse decoupling unit, which includes a bearing element and an elastic coupling element. The bearing element, in the vehicle transverse direction, displaceably, in particular freely displaceably, supports a component of the tilting mechanism, while the coupling element, in the vehicle transverse direction, counteracts a deflection of the component of the tilting mechanism supported by the bearing element. The characteristic of the resistance to the transverse deflection can in principle be chosen in any arbitrary suitable way. The resistance characteristic can be at least section wise (at least almost) constant, at least section wise rising, as well as at least section wise falling.

Preferably, a configuration is provided in which the resistance to the deflection in the vehicle transverse direction increases, preferably progressively increases, with increasing deflection. In this way, particularly favourable characteristics of the transverse stiffness of the tilting mechanism in terms of vibration comfort can be achieved, in which only with increasing deflection a considerable resistance is exerted, so that, for example, an abrupt impact against a mechanical stop or the like can e avoided.

The reduction of the transverse stiffness of the tilting mechanism achieved by the coupling element can, in principle, be chosen to be as large as desired, so as to achieve the desired gain in comfort. Preferably, the coupling element has a third transverse stiffness in the vehicle transverse direction, while the bearing element has a fourth transverse stiffness in a direction transverse to the vehicle transverse direction, the third transverse stiffness being less, in particular significantly less, than the fourth transverse stiffness. Thus, for example, it may be envisaged that the third transverse stiffness is at most 95% of the fourth transverse stiffness. Preferably, the third transverse stiffness is at most 85% of the fourth transverse stiffness and, more preferably, at most 60% of the fourth transverse stiffness. With particularly advantageous variants of the invention, the third transverse stiffness is even significantly below these values, for example, at most 20% of the fourth transverse stiffness. In this way, particularly favourable properties as regards the vibration comfort can be achieved.

The bearing element and the elastic coupling element can be arranged spatially separate from one another, and can, therefore, act on different components of the tilting mechanism or different sections of one of the components of the tilting mechanism. It is understood, however, that, with other variants of the invention, it may also be envisaged that the bearing element and the elastic coupling element are integrated in a common sub-assembly, and are possibly even formed from a single element, which provides both functions (transversely displaceable bearing and resistance to transverse deflection).

In preferred variants of the vehicle according to the invention, it is envisaged that the transverse decoupling device comprises at least one unit resilient and/or damping in the vehicle transverse direction, in order to achieve in an advantageous manner a favourable characteristic of the transverse stiffness of the tilting mechanism. The unit resilient and/or damping in the vehicle transverse direction can then in principle be constructed in an arbitrary suitable manner. In particular, it can work according to an arbitrary operating principle. Thus, for example, a hydraulic, pneumatic or mechanical operating principle as well as arbitrary combinations thereof can be envisaged.

Due to the particularly simple and robust design, the resilient and/or damping unit preferably includes at least one plastic element, in particular a rubber element. In particular, the resilient and/or damping unit can include, in particular, at least one rubber layer spring, since in this way particularly favourable stiffness characteristics can be achieved with a high stiffness in the layering direction and a low stiffness transverse to the layering direction.

The tilting mechanism, apart from the transverse decoupling device, can be constructed in an arbitrary suitable manner. Thus, for example, in a known manner, two double acting hydraulic cylinders with oppositely coupled working spaces can be provided, the wagon body side coupling points of which (in a plane running perpendicular to the vehicle longitudinal axis) are displaced towards the center of the vehicle. With variants of the vehicle according to the invention that are particularly advantageous due to the simple and robust construction, the tilting mechanism is provided in the manner of a conventional rolling support, with connecting rods inclined towards the center of the vehicle. The tilting mechanism therefore preferably includes at least one torsion element, two pivot levers as well as two connecting rods, wherein the torsion element runs in the vehicle transverse direction, the two pivot levers, in a manner spaced apart from one another, in particular in the region of the two ends of the torsion element, are secured to the torsion element, and a connecting rod is connected to a free end of each one of the pivot levers. At their ends facing towards the wagon body, the two connecting rods, with respect to their ends facing towards the running gear, are displaced towards a vehicle longitudinal mid plane.

Preferably, the transverse decoupling unit then includes in each case at least a section of the pivot lever, which is resilient in the vehicle transverse direction, wherein the resilient section can be formed by at least a section of the pivot lever configured in the manner of a leaf spring. In this way, a particularly space-saving transverse decoupling can be achieved. Furthermore, the resilient section is preferably formed by at least two leaf spring elements arranged in the manner of a parallel guidance acting in the vehicle transverse direction, wherein at least one damping element, in particular a rubber element, can be arranged between the two leaf spring elements in order to achieve a particularly favourable characteristic of the transverse stiffness.

The present invention also relates to a tilting mechanism for the arrangement between a running gear and a wagon body of a vehicle, in particular a rail vehicle, supported thereon, which is formed as a tilting mechanism with a transverse decoupling device having the features and advantages described hereinbefore. In this respect reference is therefore simply made to the explanations given above.

Further preferred variants of the invention are disclosed in the dependent claims and the following description of preferred embodiments, which refers to the accompanying drawings. It is shown in:

DESCRIPTION OF THE PREFERRED EMBODIMENTS

First Embodiment

Figure 1:
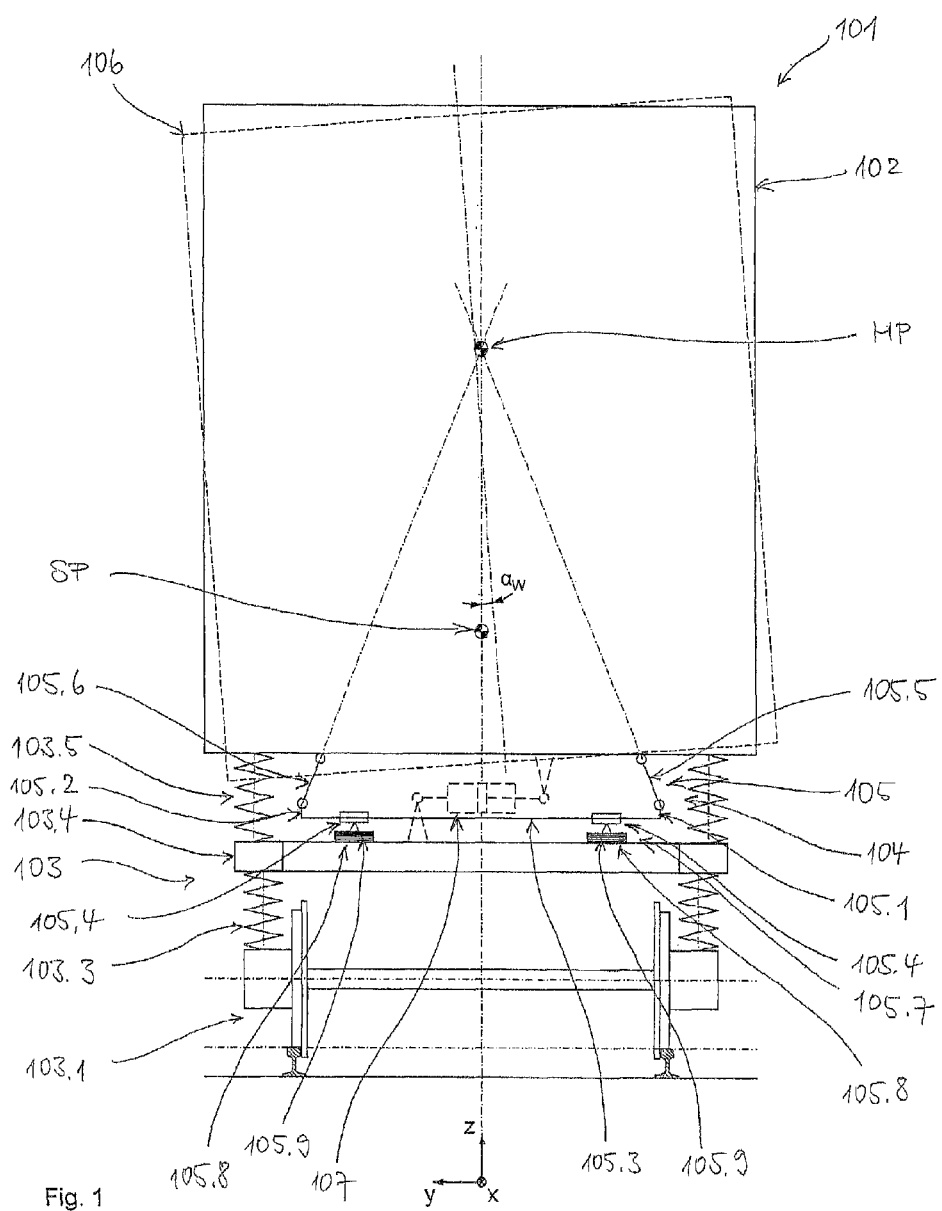
FIG. 1 a schematic sectional view of a preferred embodiment of the vehicle according to the invention with a preferred embodiment of the tilting mechanism according to the invention.

A first preferred embodiment of the vehicle according to the invention in the form of a rail vehicle 101 is described hereinafter with reference to FIGS. 1 and 2.

The vehicle 101 comprises a wagon body 102, which is supported in the region of its two ends in each case on a running gear in the form of a bogie 103. It is understood, however, that the present invention can also be used in conjunction with other configurations in which the wagon body is supported on one running gear only.

For easier understanding of the following description, a vehicle coordinate system x,y,z (predetermined by the wheel support plane of the bogie 103) is given in the figures, in which the x coordinate denotes the longitudinal direction of the rail vehicle 101, the y coordinate the transverse direction of the rail vehicle 101, and the z coordinate the height direction of the rail vehicle 101.

The bogie 103 comprises two wheel units in the form of wheel sets 103.1, 103.2, on which a bogie frame 103.4 is supported in each case via a primary spring arrangement 103.3. The wagon body 102 is in turn supported on the bogie frame 103.4 via a secondary spring arrangement 103.5. The primary spring arrangement 103.3 and the secondary spring arrangement 103.5 are illustrated as helical springs for the sake of simplicity in FIG. 1. It is understood, however, that the primary spring arrangement 103.3 and the secondary spring arrangement 103.5 can be an arbitrary suitable spring mechanism. In particular, the secondary spring arrangement 103.2 is preferably a sufficiently well known air spring mechanism or the like.

Figure 2:
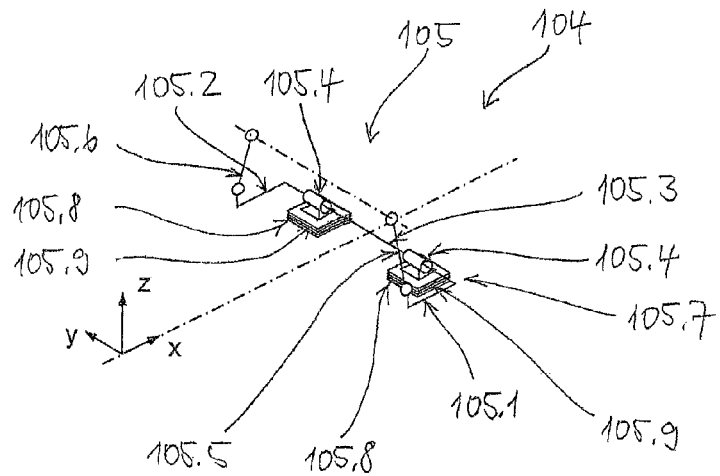
FIG. 2 a schematic perspective view of the tilting mechanism of the vehicle from FIG. 1.

FIG. 2 shows, in a perspective view as a detail of the vehicle 101, a tilting mechanism 104 that, in the region of each bogie 103, in a manner described in more detail hereinafter, acts kinematically parallel to the secondary spring arrangement 103.5 between the bogie frame 103.4 and a wagon body traverse (not shown in greater detail) connected to the wagon body 102.

As can be seen, in particular, from FIG. 2, the tilting mechanism 104 comprises a sufficiently well known rolling support 105, which is connected on the one hand to the bogie frame 103.4 and on the other hand to the wagon body 102.

As can be seen from FIG. 2, the rolling support 105 comprises a first torsion arm in the form a first pivot lever 105.1 and a second torsion arm in the form of a second pivot lever 105.2. The two levers 105.1 and 105.2 sit on both sides of the longitudinal mid plane (xz plane) of the vehicle 101, in each case in a rotationally rigid manner on the ends of a torsion shaft 105.3 of the rolling support 105. The torsion shaft 105.3 extends in the transverse direction (y direction) of the vehicle 101 and is rotatably mounted in bearing blocks 105.4, which are in turn connected to the bogie frame 103.2. A first connecting rod 105.5 is coupled to the free end of the first lever 105.1, while a second connecting rod 105.6 is coupled to the free end of the second lever 105.2. The rolling support 105 is articulatedly connected to the wagon body traverse of the wagon body 102 via the two connecting rods 105.5, 105.6.

FIGS. 1 and 2 show the state in the neutral position of the vehicle 101, which occurs with travel on a straight and non-twisted track 106. In this neutral position, in the present example, the two connecting rods 105.5, 105.6 run in the sectional plane of FIG. 1 (yz plane) inclined in such a way with respect to the height axis (z axis) of the vehicle 101 that their upper ends (coupled to the wagon body 102) are displaced towards the center of the vehicle, and their longitudinal axes intersect at a point MP, lying in the longitudinal mid plane (xz plane) of the vehicle. The connecting rods 105.5, 105.6, in a sufficiently known manner, define a rolling axis running parallel (in the neutral position) to the vehicle longitudinal axis 101.1, said rolling axis running through the point MP. The intersection point MP of the longitudinal axes of the connecting rods 105.5, 105.6, in other words, forms the instantaneous center of rotation of a rolling motion of the wagon body 102 about this rolling axis.

The rolling support 105, in a sufficiently known manner, allows a synchronous compression of the secondary spring arrangement 103.2 on both sides of the vehicle, while at the same time it prevents a pure rolling motion about the rolling axis and the instantaneous center of rotation MP. Furthermore, as can be seen, in particular, from FIG. 1, due to the inclination of the connecting rods 105.5, 105.6, kinematics with a combined movement of a rolling motion about the rolling axis and the instantaneous center of rotation MP and a transverse motion in the direction of the vehicle transverse axis (y axis) are predetermined by the rolling support 105 (as is illustrated in FIG. 1 by the dashed line contour 106). In this context it is understood that the intersection point MP and, thus, the rolling axis, as a rule, also drift sideways with a displacement of the wagon body 102 from the neutral position, due to the kinematics predetermined by the connecting rods 105.5, 105.6.

In order to be able to actively adjust the rolling angle of the wagon body 102 about the rolling axis and the instantaneous center of rotation, the vehicle 101 can in the present example include an actuator, in order to provide the adjustment movements required hereto (as is illustrated in FIG. 1 by the dashed line contour 107). For this purpose, the actuator 107 is then secured to the bogie frame 103.4 and also to the wagon body 102.

As can be seen, in particular, from FIG. 1, the rolling axis and the instantaneous center of rotation MP lie in the height direction relatively close to the center of gravity SP of the wagon body 102. As a result, in conventional vehicles, the system stiffens in the transverse direction, so that in these conventional vehicles, apart from a deterioration in the tilting comfort, above all disadvantages have to be accepted as regards the vibration comfort for the passengers.

In addition, in conventional vehicles, these stiff kinematics in the vehicle transverse direction produce a coupling of the two running gears of a rail vehicle in such a way that, with rotational deflection movements of the wagon body with respect to the running gear, a twisting occurs in the wagon body, which may lead to wheel unloading and can adversely affect the derailment safety. With conventional double deck vehicles, the instantaneous center of rotation MP can moreover lie very close to the upper deck of the vehicle, as a result of which the comfort is significantly reduced especially in the upper deck.

In order to counteract these disadvantages of conventional vehicles, the rolling support 105 of the tilting mechanism 104 comprises a transverse decoupling device 105.7, which is arranged in the region of the connection of the rolling support 105 to the bogie frame 103.4.

The transverse decoupling device 105.7 is formed by two transverse decoupling units 105.8 of the bearing blocks 105.4. The transverse decoupling units 105.8 comprise in each case a rubber layer spring 105.9, which forms the base of the bearing blocks 105.4 connected to the bogie frame 103.4.

The rubber layer spring 105.9 is arranged so that its layering direction runs in the vehicle height direction (z direction). Accordingly, the rubber layer spring 105.9 has a comparatively low transverse stiffness in the vehicle transverse direction, whereas, on the other hand, it has a comparatively high stiffness in the vehicle height direction. In the present example, the transverse stiffness of the rubber layer spring 105.9 is about 20% of its stiffness in the vehicle height direction. It is understood however that, with other variants of the invention, the already mentioned, differing relationships between these two stiffness types can also be selected via the properties of the rubber layer springs 105.9.

In the present example, the transverse stiffness of the respective rubber layer spring 105.9 is about 1 kN/mm, so that the overall transverse stiffness of the transverse decoupling device 106.7 is about 2 kN/mm. It is understood however that, in other variants of the invention, other transverse stiffness values can also be chosen as desired. In particular, a transverse stiffness of almost 0 kN/mm can also be envisaged.

The use of the rubber layer springs 105.9 also has the advantage that they form, in an extremely space-saving manner, a bearing element as well as a coupling element in the sense of the present invention. Thus, they perform the bearing and (within certain limits) guidance function as well as the elastic coupling of the tilting mechanism 105.7 to the bogie frame 103.4.

The rubber layer springs 105.9, in the present example, have a correspondingly low stiffness also in the vehicle longitudinal direction. It is understood however that, in other variants of the vehicle according to the invention, it may also be envisaged that a corresponding guidance can be achieved for example via stop means (located, in the vehicle longitudinal direction, at the front and rear), which restrict the movement in the vehicle longitudinal direction. Such guidance can also be achieved via a V-shaped configuration of the rubber layer springs.

The rubber layer springs 105.9 also incorporate (thanks to their internal friction in the plastic material) the function of a damping device. In addition, depending on their design, they exert a constantly or possibly even progressively increasing resistance to a transverse deflection, which has a positive effect on the travel comfort since relatively small transverse impacts (i.e. impacts in the vehicle transverse direction) can be immediately absorbed without any problem, while larger transverse impacts can be dissipated comparatively smoothly (without for example having to impact against a stop means or the like).

An additional transverse displaceability of the wagon body 102 with respect to the bogie 103 in the vehicle transverse direction is introduced into the tilting mechanism 104 by the transverse decoupling device 105.7. The overall transverse stiffness of the tilting mechanism 105.7 with uninhibited transverse displaceability of the rubber layer springs 105.9 in the vehicle transverse direction corresponds to a first transverse stiffness, while in the case of an inhibition of the transverse displaceability of the rubber layer springs 105.9 in the vehicle transverse direction it corresponds to a second transverse stiffness. In the present example, this first transverse stiffness is less than 20% of the second transverse stiffness, as a result of which particularly favourable properties as regards the vibration comfort can be achieved. It is understood however that, in other variants of the invention, the already mentioned differing relationships between the first and second transverse stiffness can also be adjusted via the properties of the rubber layer springs 105.9.

Due to this additional transverse elasticity introduced into the tilting mechanism 104 with the transverse decoupling device 105.7, on the one hand, the vibration comfort is improved compared to conventional vehicles without such a transverse decoupling device. In addition, a rotational deflection of the wagon body 102 with respect to the bogie 103 can be accommodated in the transverse decoupling device 105.7, without producing additional twisting in the wagon body 102. Furthermore, in this way the comfort and the vibration behaviour can be improved especially in the upper part of the wagon body, which is advantageous in particular with double-deck railcars.

In the present example, the rubber layer spring 105.9 is arranged on the base of the bearing blocks 105.4. It is understood however that, in other variants of the invention, it may also be envisaged that a rubber layer spring is integrated in the bearing blocks 105.4. Thus, for example, it may be envisaged that a correspondingly cylindrical shaped rubber layer spring is introduced between the torsion shaft 105.3 and the bearing shell of the respective bearing block 105.4. In this way, if a particularly compact and space-saving arrangement can be achieved.

Second Embodiment

Figure 3:
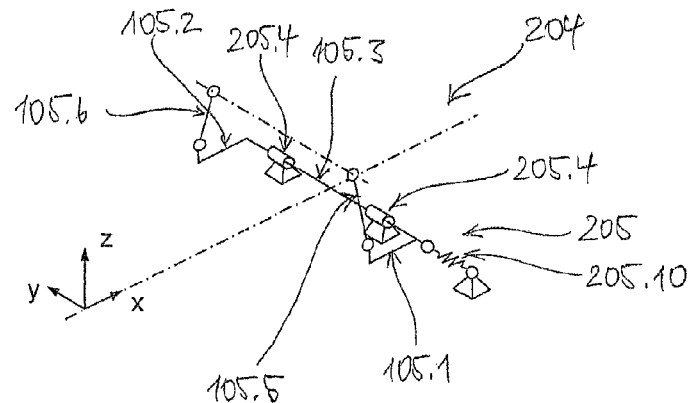
FIG. 3 a schematic perspective view of a further preferred embodiment of the tilting mechanism according to the invention.

A further advantageous embodiment of the tilting mechanism 204 according to the invention is illustrated in FIG. 3. The tilting mechanism 204, in its basic design and functionality, corresponds in this case to the tilting mechanism 104 of FIGS. 1 and 2, and, in particular, it can be used instead of the tilting mechanism 104 in the vehicle 101, so that here simply the differences will be discussed. In particular, identical components are provided with the same reference numerals, while similar components are provided with reference numerals increased by the value 100. Unless stated otherwise hereinafter, as regards the features, functions and advantages of these components, reference is made to the above descriptions in connection with the first embodiment.

The difference compared to the embodiment of FIGS. 1 and 2 is in the design of the transverse decoupling device 205.7. In this embodiment, the bearing blocks 205.4 are rigidly connected to the bogie frame 103.4, whereas they freely displaceably support the torsion shaft 105.3 in the vehicle transverse direction (over a sufficiently large stroke) and thus form a bearing element of the tilting mechanism 204 within the meaning of the present invention.

In the present example, the elastic coupling element, which defines the transverse stiffness of the transverse decoupling device 205.7 and exerts a corresponding resistance to the transverse motion of the tilting mechanism 204, is formed by a separate spring 205.10 connected in the region of the first lever arm 105.1, which is joined at its other end to the bogie frame 103.4 and is thus supported against the latter.

It is understood however that, in other variants of the invention, an arbitrary different arrangement of the coupling element can be chosen. In particular, it can be arranged in the region of the bearing blocks 205.4 and can optionally be supported on the latter.

Third Embodiment

Figure 4:
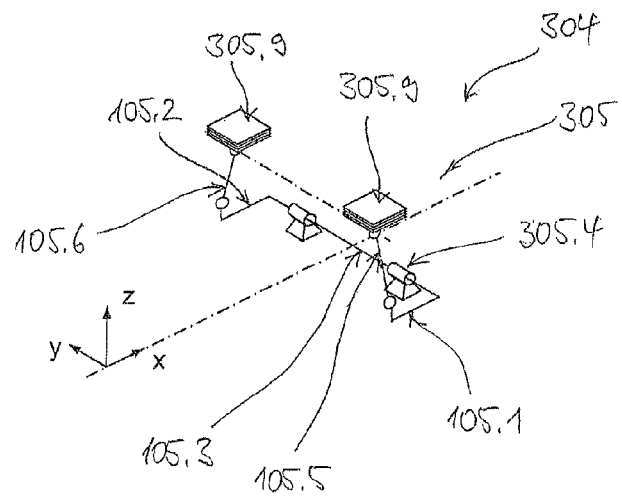
FIG. 4 a schematic perspective view of a further preferred embodiment of the tilting mechanism according to the invention.

A further advantageous embodiment of the tilting mechanism 304 according to the invention is illustrated in FIG. 4. The tilting mechanism 304, in its basic design and functionality, corresponds in this case to the tilting mechanism 104 of FIGS. 1 and 2, and, in particular, can be used instead of the tilting mechanism 104 in the vehicle 101, so that simply the differences will be discussed here. In particular, identical components are provided with the same reference numerals, while similar components are provided with reference numerals increased by the value 200. Unless stated otherwise hereinafter, as regards the features, functions and advantages of these components, reference is made to the above descriptions in connection with the first embodiment.

The difference compared to the embodiment of FIGS. 1 and 2 consists simply in the arrangement of the transverse decoupling device 305.7. In this embodiment, the bearing blocks 305.4 are rigidly connected to the bogie frame 103.4, and they fix the torsion shaft 105.3 also in the vehicle transverse direction. The transverse decoupling units 305.8 are formed by rubber layer springs 305.9, which are coupled, on the one hand, to the wagon body traverse of the wagon body 102 and, on the other hand, to the connecting rods 105.5 and 105.6. The rubber layer springs 305.9 are formed identically to the rubber layer springs 105.9 of the first embodiment, so that reference is made specifically to the above comments regarding their properties.

Fourth Embodiment

Figure 5:
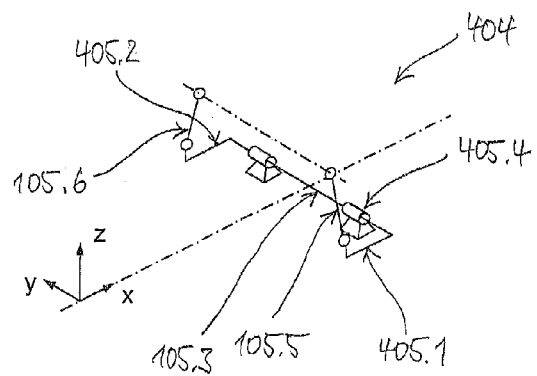
FIG. 5 a schematic perspective view of a further preferred embodiment of the tilting mechanism according to the invention.
Figure 6:
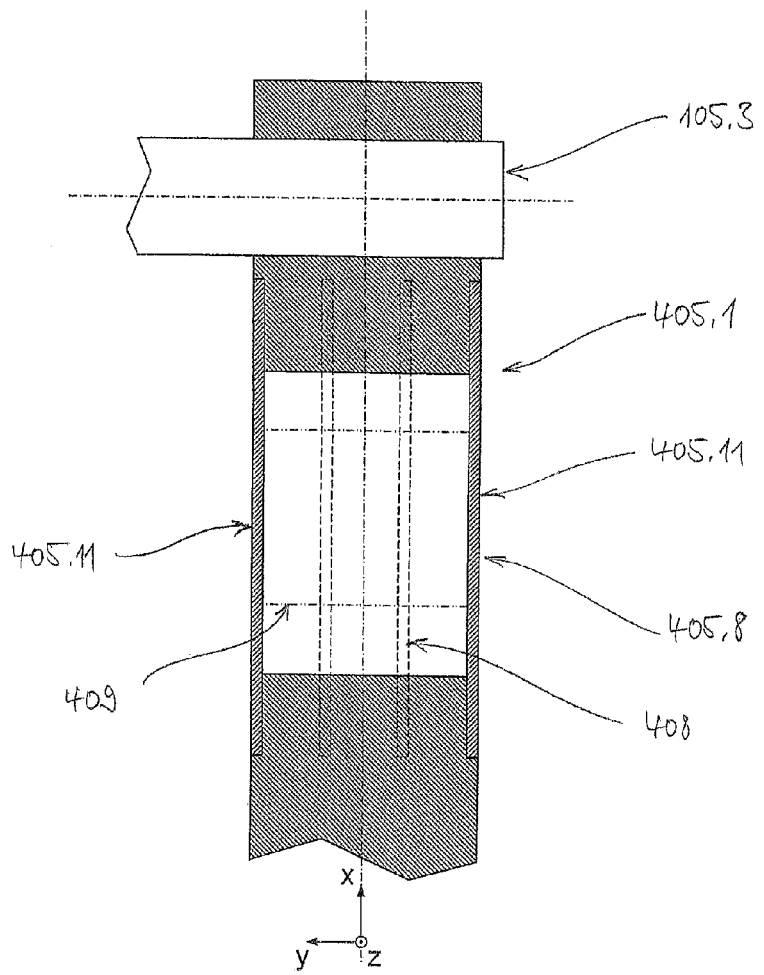
FIG. 6 a schematic perspective sectional view of a detail of the tilting mechanism of FIG. 5.

A further advantageous embodiment of the tilting mechanism 404 according to the invention is illustrated in FIGS. 5 and 6. The tilting mechanism 404, in its basic design and functionality, corresponds in this case to the tilting mechanism 104 of FIGS. 1 and 2, and, in particular, it can be used instead of the tilting mechanism 104 in the vehicle 101, so that simply the differences will be discussed here. In particular, identical components are provided with the same reference numerals, while similar components are provided with reference numerals increased by the value 300. Unless stated otherwise hereinafter, as regards the features, functions and advantages of these components, reference is made to the above descriptions in connection with the first embodiment.

The difference compared to the embodiment of FIGS. 1 and 2 consist again in the design of the transverse decoupling device 405.7. In this embodiment, the bearing blocks 305.4 are again rigidly connected to the bogie frame 103.4, and they fix the torsion shaft 105.3 also in the vehicle transverse direction. On the other hand, the transverse decoupling units are formed by laterally soft sections 405.8 of the (identically shaped) lever arms 405.1 and 405.2, as is described hereinafter with reference to the first lever arm 405.1.

As can be seen from FIG. 6, the lever arm 405.1 comprises for this purpose two leaf spring shaped sections 405.11 spaced apart from one another in the vehicle transverse direction, the planes of extension (arranged substantially parallel to one another) of which (in the unloaded state illustrated in FIG. 6) run perpendicular to the pivot axis of the torsion shaft 105.3. Accordingly, the sections 405.111 can exert a correspondingly large torsional moment on the torsion shaft 105.3, whereas they ensure the transverse elasticity of the transverse decoupling device 405.7, since they are elastically formed perpendicular to their main extension planes and, thus, in the vehicle transverse direction.

A parallel guidance within the lever arm 405.1 is realised by the parallel arrangement of the two leaf springs 405.11. It is understood however that, in other variants of the invention, a single correspondingly leaf spring shaped section may possibly also be sufficient. Likewise, more than two leaf spring shaped sections can also be provided, as is illustrated by the dashed contour 408 in FIG. 6.

In order to achieve an additional damping, an elastic damping element, for example, a rubber element or the like, can be arranged between the two leaf springs 405.11, as is illustrated by the double-dot-dashed contour 409 in FIG. 6.

The present invention has been described hereinbefore exclusively using examples of rail vehicles. It is understood, however, that the invention can also be used in conjunction with any other types of vehicles.

The invention claimed is:

1. A vehicle, in particular rail vehicle, comprising:
    a wagon body; and
    a running gear on which the wagon body is supported, wherein
    the wagon body and the running gear define a vehicle longitudinal direction, a vehicle transverse direction and a vehicle height direction;
    a tilting mechanism is arranged between the wagon body and the running gear, which is designed to impose, during a transverse displacement in the vehicle transverse direction, upon the wagon body a rolling motion about a rolling axis parallel to the vehicle longitudinal direction,
    the tilting mechanism comprises a transverse decoupling device, and
    the transverse decoupling device is designed to reduce the stiffness of the tilting mechanism against a pure transverse displacement of the wagon body with respect to the running gear, wherein
    the tilting mechanism comprises at least one torsion element, two pivot levers and also two connecting rods,
    the torsion element runs in the vehicle transverse direction,
    the two pivot levers, in a manner spaced apart from one another, are fixed to the torsion element, in particular, in the region of the two ends of the torsion element,
    each connecting rod couples a free end of one of the pivot levers to the wagon body, and
    the two connecting rods, at their end facing towards the wagon body, are arranged displaced towards a vehicle longitudinal axis mid plane with respect to their ends facing towards the running gear, and
    the transverse decoupling unit includes at least one section of the pivot lever resilient in the vehicle transverse direction,
    the resilient section being formed by at least one section of the pivot lever configured in the manner of a leaf spring.

2. The vehicle according to claim 1, wherein the transverse decoupling device, in the vehicle transverse direction, introduces into the tilting mechanism a transverse displaceability of the wagon body with respect to the running gear, the tilting mechanism with uninhibited transverse displaceability of the transverse decoupling device has a first transverse stiffness in the vehicle transverse direction, the tilting mechanism with inhibited transverse displaceability of the transverse decoupling device has a second transverse stiffness in the vehicle transverse direction, and the first transverse stiffness is at most 95% of the second transverse stiffness, preferably at most 85% of the second transverse stiffness, more preferably at most 60% of the second transverse stiffness.

3. The vehicle according to claim 1, wherein the transverse decoupling device, in the vehicle transverse direction, has a transverse stiffness of at most up to 20 kN/mm, preferably a transverse stiffness of at most up to 10 kN/mm, more preferably a transverse stiffness of at most up to 2 kN/mm.

4. The vehicle according to claim 1, wherein the transverse decoupling device has at least one transverse decoupling unit, the transverse decoupling unit is arranged in the region of the connection of the tilting mechanism to the running gear and/or the transverse decoupling unit is arranged in the region of the connection of tilting mechanism to the wagon body and/or the transverse decoupling unit is arranged between two components of the tilting mechanism.

5. The vehicle according to claim 1, wherein the transverse decoupling device comprises at least one transverse decoupling unit, the transverse decoupling unit includes a bearing element and an elastic coupling element, the bearing element displaceably, in particular freely displaceably, supports a component of the tilting mechanism in the vehicle transverse direction, and the coupling element, in the vehicle transverse direction, exerts a resistance to a deflection of the component of the tilting mechanism supported by the bearing element, in particular, exerts a, preferably progressively, increasing resistance with increasing deflection.

6. The vehicle according to claim 5, wherein the coupling element has a third transverse stiffness in the vehicle transverse direction the bearing element has a fourth transverse stiffness in a direction transverse to the vehicle transverse direction, the third transverse stiffness is less than the fourth transverse stiffness, in particular, the third transverse stiffness is significantly less than the fourth transverse stiffness, and/or the third transverse stiffness is at most 95% of the fourth transverse stiffness, preferably at most 85% of the fourth transverse stiffness, more preferably at most 60% of the fourth transverse stiffness.

7. The vehicle according to claim 1, wherein the transverse decoupling device has at least one resilient and/or damping unit in the vehicle transverse direction, the resilient and/or damping unit comprises, in particular, at least one plastic element, in particular a rubber element, and/or the resilient and/or damping unit includes, in particular, at least one rubber layer spring.

8. The vehicle according to claim 1, wherein the resilient section is formed by at least two leaf spring elements arranged in the manner of a parallel guidance acting in the vehicle transverse direction, and at least one damping element, in particular a rubber element, is arranged between the two leaf spring elements.

9. A vehicle, in particular rail vehicle, comprising:

a wagon body and a running gear on which the wagon body is supported, wherein the wagon body and the running gear define a vehicle longitudinal direction, a vehicle transverse direction and a vehicle height direction;

a tilting mechanism is arranged between the wagon body and the running gear, which is designed to impose, during a transverse displacement in the vehicle transverse direction, upon the wagon body a rolling motion about a rolling axis parallel to the vehicle longitudinal direction, the tilting mechanism comprises a transverse decoupling device, and the transverse decoupling device is designed to reduce the stiffness of the tilting mechanism against a pure transverse displacement of the wagon body with respect to the running gear, wherein the tilting mechanism comprises at least one torsion element, two pivot levers and also two connecting rods, the torsion element runs in the vehicle transverse direction, the two pivot levers, in a manner spaced apart from one another, are fixed to the torsion element, in particular, in the region of the two ends of the torsion element, a connecting rod is coupled to the free end of each one of the pivot levers, and the two connecting rods, at their end facing towards the wagon body, are arranged displaced towards a vehicle longitudinal axis mid plane with respect to their ends facing towards the running gear, wherein the transverse decoupling unit includes at least one section of the pivot lever resilient in the vehicle transverse direction providing said reduction of the stiffness of the tilting mechanism against a pure transverse displacement of the wagon body with respect to the running gear.

10. The vehicle according to claim 9, wherein the resilient section is formed by at least one section of the pivot lever configured in the manner of a leaf spring.

11. The vehicle according to claim 9, wherein the resilient section is formed by at least two leaf spring elements arranged in the manner of a parallel guidance acting in the vehicle transverse direction, and at least one damping element, in particular a rubber element, is arranged between the two leaf spring elements.

12. A vehicle, in particular rail vehicle, comprising:

a wagon body; and a running gear on which the wagon body is supported, wherein the wagon body and the running gear define a vehicle longitudinal direction, a vehicle transverse direction and a vehicle height direction, a tilting mechanism is arranged between the wagon body and the running gear, which is designed to impose, during a transverse displacement in the vehicle transverse direction, upon the wagon body a rolling motion about a rolling axis parallel to the vehicle longitudinal direction, the tilting mechanism comprises a transverse decoupling device, and the transverse decoupling device is designed to reduce the stiffness of the tilting mechanism against a pure transverse displacement of the wagon body with respect to the running gear, wherein the transverse decoupling device, in the vehicle transverse direction, introduces into the tilting mechanism a transverse displaceability of the wagon body with respect to the running gear, the tilting mechanism with uninhibited transverse displaceability of the transverse decoupling device has a first transverse stiffness in the vehicle transverse direction, the tilting mechanism with inhibited transverse displaceability of the transverse decoupling device has a second transverse stiffness in the vehicle transverse direction, and the first transverse stiffness is at most 95% of the second transverse stiffness.

13. The vehicle according to claim 12, wherein the first transverse stiffness is one of at most 85% of the second transverse stiffness and at most 60% of the second transverse stiffness.

* * * * *